United States Patent [19]
Majumdar

[11] 3,887,386

[45] *June 3, 1975

[54] GLASS FIBRES AND COMPOSITIONS CONTAINING GLASS FIBRES

[75] Inventor: Amalendu Jyoti Majumdar, Watford, England

[73] Assignee: National Research and Development Corporation, London, England

[*] Notice: The portion of the term of this patent subsequent to Jan. 1, 1991 has been disclaimed.

[22] Filed: July 24, 1973

[21] Appl. No.: 382,173

Related U.S. Application Data

[60] Division of Ser. No. 127,361, March 23, 1971, Pat. No. 3,783,092, which is a continuation-in-part of Ser. No. 649,463, June 28, 1967, abandoned, and a continuation-in-part of Ser. No. 748,645, July 30, 1968, abandoned, and a continuation-in-part of Ser. No. 31,184, March 26, 1970, abandoned.

[30] Foreign Application Priority Data

Apr. 3, 1969  United Kingdom............... 17448/69
Aug. 4, 1967  United Kingdom............... 35901/67
July 11, 1966  United Kingdom............... 31025/66
Feb. 2, 1967  United Kingdom................. 5070/67

[52] U.S. Cl. ...................................... 106/99; 106/50
[51] Int. Cl. ....................... C04b 18/22; C04b 31/06
[58] Field of Search ............................... 106/99, 50

[56] References Cited
UNITED STATES PATENTS

| | | | |
|---|---|---|---|
| 2,425,883 | 8/1947 | Jackson ................................. | 106/99 |
| 2,509,599 | 5/1950 | Hollenberg ........................... | 106/99 |
| 2,738,285 | 3/1956 | Biefeld et al.......................... | 106/99 |
| 3,062,670 | 11/1962 | Marzocchi et al..................... | 106/99 |
| 3,354,031 | 11/1967 | Kozacik ................................. | 106/99 |
| 3,783,092 | 1/1974 | Majumdar.............................. | 106/99 |

*Primary Examiner*—J. Poer
*Attorney, Agent, or Firm*—Flynn & Frishauf

[57] ABSTRACT

Fibre reinforced cementitious products are described comprising glass fibrous material distributed throughout a cement matrix, in which the glass is one having per se a degree of alkali resistance such that when tested in the form of an abraded fibre of length 2½ inches and diameter of from 0.4 to $1.0 \times 10^{-3}$ inches said fibre has a tensile strength of at least 100,000 p.s.i. after treatment with saturated aqueous $Ca(OH)_2$ solution at 100°C. for 4 hours followed by successive washings at ambient temperature with water, then with aqueous hydrochloric acid (1%) for 1 minute, water, acetone, following by drying, said fibre experiencing not more than 10% reduction in diameter during said test.

The reinforcement of Portland cement structures by fibres of diameter 0.4 to $1.0 \times 10^{-3}$ and lengths of up to 4 inches is described.

Alkali resistant glasses useful for production of these products comprise the $CaO-MgO-Al_2O_3-SiO_2$ glasses including those in the anorthite field, silica zirconia glasses, and silica stannic oxide glasses.

The products have outstanding durability and impact resistance.

16 Claims, No Drawings

GLASS FIBRES AND COMPOSITIONS CONTAINING GLASS FIBRES

RELATED APPLICATIONS

This application is a division of application Ser. No. 127,361, filed Mar. 23, 1971, now U.S. Pat. No. 3,783,092, which is a continuation-in-part of application Ser. No. 649,463, filed June 28, 1967, and of application Ser. No. 748,645, filed July 30, 1968, and of application Ser. No. 31,184, filed Mar. 26, 1970. Applications Ser. Nos. 649,463, 748,645, and 31,184 have been abandoned.

This invention relates to reinforced cementitious products, e.g. concrete, based on Portland cement or other cement e.g. aluminous or so-called "high-alumina" cement, or mixtures of these with other materials including blast-furnace slag and pozzolona.

Extensive use has been made, over many years, of asbestos as a fibrous reinforcing material in cementitious products employed in the building industry, such as asbestos-cement pipes and roofing sheets. Although used on a large scale, asbestos-cement products are not entirely suitable for many applications but no acceptable substitute for asbestos has yet been found. Such cement-asbestos products are described by Kozacik in U.S. Pat. No. 3,354,031, wherein asbestos serves as a reinforcement and a very small amount of a mineral glass fibre is included to serve as a filtration aid in producing the products. With the development of glass fibre materials, proposals have been made to substitute glass fibres for asbestos in typical structural and other components but these proposals have in general failed to lead to products of acceptable strength and durability. One approach to increase the strength of cementitious products with glass fibres is described in U.S. Pat. No. 2,793,130. The glass fibres are provided, before incorporation in a cement slurry, with a water-insoluble coating. The coating, designed to improve bonding of glass fibre and cementitious materials, is formed by reaction of a polyvalent metal salt and a water soluble oxide or hydroxide. However, the principal reason for the lack of success of previous proposals is that the strongly alkaline environment, especially in products based on Portland cement, is sufficiently severe in certain cases to disintegrate glass fibres and for this reason it has been assumed that such fibres cannot be applied successfully as reinforcing materials without resort to protective measures which add considerably to the cost of production of the composite materials. It is found, for example, that protective coatings are insufficiently reliable because in practice it is almost impossible to avoid discontinuities in the coating with the result that the underlying fibre is exposed to a considerable extent to the corrosive action of the cement.

Among the properties of certain glass compositions, a degree of resistance to alkaline solutions has been observed in tests carried out with bulk specimens of glass. These observations, however, have not been recognised as having any bearing on the problem of producing satisfactory cement/glass composite structures in which the glass, being in fibre form, is thereby exposed to the corrosive environment over a considerably large surface area per unit weight.

It has now been found that glass fibre reinforced cement products having outstanding properties can in fact be obtained provided that the glass in fibre form has sufficient alkali resistance to meet the requirements of a test which will be specified hereinafter. It is noted that alkali resistance of the glass fibres is essential for the glass reinforced cementitious products of this invention. This is to be contrasted with prior descriptions of glass fibres exhibiting corrosion resistance to atmospheric conditions, which are generally acidic. One such description is given in U.S. Pat. No. 3,095,311 wherein glasses are shown to resist the action of hydrochloric acid.

In my co-pending application Ser. Nos. 649,463 and 748,645, I have described composite fibre/cementitious products in which the fibrous reinforcing material is primarily a glass having per se a degree of alkali resistance such that when tested in the form of an abraded fibre of length 2½ inches and diameter of from 0.4 to $1.0 \times 10^{-3}$ inches said fibre has a tensile strength of at least 100,000 p.s.i. after treatment with saturated aqueous Ca(OH)$_2$ solution at 100°C for 4 hours followed by successive washings at ambient temperature with water, then with aqueous hydrochloric acid (1%) for 1 minute, water, acetone, followed by drying, said fibre experiencing not more than 10% reduction in diameter during said test. Preferably the tensile strength of such fibres after the specified treatment is at least 200,000 p.s.i.

In the case of products based on Portland cement excellent reinforcement is provided by means of fibres having a diameter of about 0.4 to about $1.0 \times 10^{-3}$ inches. In practice it is particularly convenient to employ short fibres of length up to about 4 inches, for example, fibres having a length of the order of 2.5 inches.

Glass fibre-reinforced concrete and other cementitious materials produced in accordance with this invention have been found to exhibit such high strengths that for certain applications the glass fibres may be used in either partial or complete replacement of steel in structural components.

It will be appreciated that suitable glass compositions for use in accordance with this invention may be determined by forming fibres therefrom and subjecting such fibres to the test described above.

For reinforcing cementitious matrices at temperatures higher than ambient it is desirable, moreover, that the fibres exhibit resistance to attack by alkali metal hydroxides, in addition to attack by Ca(OH)$_2$. A test for this resistance, similar to the previously mentioned test for attack by Ca(OH)$_2$, is as follows:

An individual glass fibre having a diameter in the range of from $0.4 - 1.0 \times 10^{-3}$ inches and a length of 2½ inches is exposed to attack by N NaOH solution for 1½ hours at 100°C. After exposure, the fibre is taken out of the solution at room temperature, washed three times with distilled water, then with dilute HCl (1%) for ½ minute, followed by several washes with distilled water. Finally, the fibre is washed with acetone twice and dried, after which its tensile strength is determined by measuring the breaking load with an Instron testing machine and estimating the fibre diameter by an optical microscope.

A glass fibre exhibiting a tensile strength of at least 100,000 and preferably at least 200,000 lbs/sq. in. after the test, and experiencing during the test a reduction in diameter no greater than 10%, has the required properties for reinforcing the cementitious matrices at higher than ambient temperatures.

In assessing the suitability of glass fibres for reinforcing cementitious matrices, it is also instructive to study the behaviour of the fibres in a cement effluent solution at different temperatures and different ages. The exact composition of the solution phase produced when Portland cement is mixed with water varies greatly with cements from different sources. A synthetic analogue of such a solution can, however, be prepared in the laboratory which will have ionic concentrations of $Na^+$ and $K^+$ similar to those found in the solution phase of average Portland cements. If this solution is then made saturated with respect to $Ca(OH)_2$, it represents approximately the compositions of the solution phase of a Portland cement slurry regarding the concentrations of hydroxides. A typical "cement effluent" composition is:

| Alkali | Concentration, in g/litre |
| --- | --- |
| NaOH | 0.88 |
| KOH | 3.45 |
| Ca(OH)$_2$ | 0.48 |

The desired alkali resistance properties are exhibited by fibres of certain glasses of $CaO-Al_2O_3-MgO-SiO_2$ type, wherein the oxide ratios are selected so that the composition of the glass lies within the anorthite primary phase volume of the $CaO-Al_2O_3-SiO_2-MgO$ phase diagram or in its immediate vicinity, and the glasses are substantially boron free i.e. have virtually no $B_2O_3$.

Such phase diagram is described in the article "Quaternary slags $CaO-MgO-Al_2O_3-SiO_2$: initial crystallization and fields of crystallization at constant magnesia planes" by G. Cavalier and M. Sandrea-Deudon, Revue de Metallurgie, 57, 1143–1157 (December 1960).

Within this group of glasses one preferred class of glasses is represented by those in which the main oxide percentages are selected to be in the following ranges:

| Oxide | Weight % |
| --- | --- |
| SiO$_2$ | 50–65 |
| Al$_2$O$_3$ | 12–21 |
| CaO | 10–21 |
| MgO | 3–10 |
| | 100.0 |

Minor amounts of other metallic oxides such as also impart alkali-resistance may be present also, for example, $TiO_2$, $Cr_2O_3$, $ZrO_2$, $Fe_2O_3$, $ZnO$, $BaO$ and $MnO$. The total amount of these additives will normally be less than 10% by weight of the overall oxide mix of the glass.

For locating the compositions of the more complex glasses in the $CaO-Al_2O_3-SiO_2-MgO$ phase diagram, it may be assumed that optional substituent $ZrO_2$ substitutes for $SiO_2$; optional substituents $TiO_2$, $Fe_2O_3$, $Cr_2O_3$ for $Al_2O_3$; and optional substituents $BaO$, $MnO$, $ZnO$ for $CaO$.

The optional substituents, if their percentages are high, may sometimes change the composition of the glass in such a way that it falls outside the anorthite primary phase volume of the $CaO-Al_2O_3-MgO-SiO_2$ system but still exhibit adequate alkali-resistance. An example of such a glass in one containing a relatively high total percentage of MgO + MnO, say up to 20%.

The present invention comprises a composite fibre/cementitious product in which the fibrous reinforcing material is at least partly and preferably primarily or wholly glass fibrous material, the glass having sufficient alkali resistance per se to pass the test hereinbefore specified, said fibrous material being distributed throughout a cement matrix.

The present invention also provides a process for producing a reinforced cementitious product comprising incorporating into the raw cementitious mix prior to setting glass fibrous material, the glass having alkali-resistance sufficient to pass the abovementioned test.

It will be appreciated that the glass fibre tested should be initially in an "abraded" state as opposed to the "virgin" state in which it is originally made at the point of actual manufacture by pulling, extrusion or the like. The "virgin" condition of a glass fibre is rapidly degraded to the stable "abraded" condition by manual or mechanical handling, with simultaneous substantial decrease in strength. This is because the initial strength of the fibre, in the low diameter range contemplated, is determined prior to alkali attack primarily by the surface condition of the fibre. In the case of glass fibres of diameter in the range $0.5 - 1.0 \times 10^{-3}$ inches and of oxide composition 19% CaO, 21% $Al_2O_3$, 55% $SiO_2$, 5% MgO, a virgin strength when freshly drawn of around 400,000 – 500,000 lbs/sq. in. corresponds to an "abraded" strength around 200,000 lbs/sq.in.

The glasses used for the purposes of this invention are preferably those capable of fiberization under conditions which are acceptable and convenient on the scale of commercial manufacture. Common methods of fiberization are continuous pulling (or spinning), blowing and centrifugation. The viscosity-temperature relationships of the glasses in the anorthite field are such as to enable fibres to be conveniently made by pulling in particular. Pulling of fibres is in general much facilitated by including in the glass composition in any event a minor amount of a fluxing agent. The fluxing agent can both reduce the melting point of the glass and the viscosity of the melt, so providing a considerable advantage in the commercial manufacture of the fibres. A preferred fluxing agent is $CaF_2$ but other fluxing agents already known for other glasses can be employed, for example $P_2O_5$, alkali metal oxides and $MnO$. Mixtures of fluxing agents may also be employed. It is noteworthy that MnO is effective as a fluxing agent as well as being a desirable optional substituent for the provision in the glass of the desired alkali-resisting properties. The quantities of fluxing agent or agents to be included in the glass depends on the composition of the glass to be drawn into fibres - its refractoriness and its viscosity-temperature relationship. It may be up to 10% by weight of the overall oxide mix of the glass, although usually less. For $CaF_2$ in some of the glasses studied, a suitable quantity is 3% by weight of the total mix, but significant improvement in pulling characteristics can still be achieved with the incorporation of much smaller percentages.

As compared with products comprising fibres of the glasses mentioned by specific composition above, products of improved properties are obtained if use is made of fibres derived from certain siliceous glasses containing relatively high proportions of $ZrO_2$ as described in U.S. application Ser. No. 748,645. The glasses may also contain minor proportions of other oxides, e.g. $Al_2O_3$, capable of substituting for $SiO_2$ in the network, but SiO₂ is the dominant glass-forming ingredient. Thus the glass preferably contains as essential ingredient at least 65% SiO₂ and at least 10% ZrO₂, and generally 65–80% SiO₂, 10–20% ZrO₂. The percentage of ZrO₂ is preferably about 15 to about 16%. In order to ease glass melting and subsequent fiberization it is desirable to add other oxides, network modifiers, in suitable quantities. Alkali and alkaline earth metal oxides and ZnO are amongst the oxides which can be used to modify the glass structure in this way. Up to 20% Na₂O has been found adequate although the preferred proportion is somewhat lower, say 10–12%. Generally, the network modifier or modifiers will be present in the range of 10–20%.

Small quantities of other auxiliary oxides whose precise role in the silica-zirconia glass structure is not known can nevertheless affect its properties in a favourable way for the production of fibres. Less than 3% of La₂O₃ has been found adequate to reduce the viscosity of the present glasses without increasing their tendency to crystallization.

The network modifiers, and auxiliary oxides, may also act as fluxing agents; Li₂O for example, acts both as a network modifier and fluxing agent. Fluxing agents which are not also network modifiers will normally be present, however, in a maximum of 10%.

A glass containing about 16% ZrO₂, 11% Na₂O, 1% Li₂O, 1% Al₂O₃, remainder (71%) SiO₂ is capable of being fiberized at 1450°–1500°C to provide alkali-resistant glass fibres suitable for the purposes mentioned herein. It is most surprising that these glasses are capable of being fiberized on a commercially practicable scale bearing in mind the natures of ZrO₂ and SiO₂. In addition to the limitation imposed by the 1774°C melting point of platinum, the metal normally used for bushings when making the glass fibres by spinning techniques, the melt requires to have a suitable viscosity and crystallization has to be avoided. These three factors of melt temperature, viscosity and crystallization are to some extent conflicting. A lower viscosity, whilst assisting drawing, increases the risk of crystallization since diffusion of the seed nuclei is accelerated. ZrO₂ is recognized as increasing the refractoriness of the glass, on account of the high melting point of the oxide, and SiO₂ as providing a component in the melt of high viscosity. While SiO₂, ZrO₂ represent the essential oxides of the glasses for the present fibres, other oxides will therefore usually be added as discussed above.

It has also been found that improved fibres and fibre/cement composites can be derived from certain siliceous glasses containing substantial proportions of SnO₂. Also in accordance with this invention improved glasses, glass fibres, and composite fibre/cementitious products in which the glass fibres are distributed throughout a cement matrix, are those in which the glass comprises SiO₂ as the dominant glass forming ingredient, an alkali metal oxide or alkaline earth metal oxide or ZnO as the network modifier, and more than 5% by weight of SnO₂. Preferably for the production of composites of outstanding strength and durability, the glass contains at least 8% SnO₂.

In practice convenient tin oxide glass compositions are those containing at least 55% SiO₂ and a network modifier which is preferably Na₂O, but may alternatively be K₂O or CaO or mixtures of these three oxides. For example, glasses containing 55 – 80% SiO₂, 10 – 30% Na₂O and 8 – 18% SnO₂, and preferably 70 – 80% SiO₂, 10 – 14% Na₂O and 10 – 16% SnO₂ give rise to very satisfactory materials.

If desired the tin oxide glasses may contain one or more additional oxides as a flux or partial replacement of the glass forming ingredient or network modifier, the total amount of additional oxide or oxides being not greater than 10% and preferably not greater than 5%. For example, the SiO₂ may be replaced to a minor extent by Al₂O₃.

In order to ease melting and subsequent fiberization fluxing oxides may also be included, in amounts in the range of 1 – 10% of the total weight of the other components of the oxide mix. Li₂O and La₂O₃ are examples of two such oxides, being used preferably in amounts in the range of 1 – 3%.

The glass fibres contemplated herein have such a high degree of resistance to alkali, as defined above, that the surfaces thereof need not be coated with a water-insoluble coating of the type proposed by Shannon in U.S. Pat. No. 2,793,130 to keep the surfaces from contact with the cementitious materials. Furthermore, it is contemplated that conventional materials (sizes) used for sizing or coating glass fibres can be used. Generally, such are employed as an aid in the handling of glass fibres. When contacted with a water/cement slurry and as the desired reinforced cementitious products are formed, a substantial portion of the size is often unavoidably removed from the glass fibres, thus bringing fibre surfaces into direct contact with the corrosive environment of the slurry. Conventional sizes which can be employed are for example those based on polyvinyl acetate containing, if desired, a silane additive and a wetting agent.

Desirably, alkali-resistant glass fibres constitute the sole or at least a major component of the total fibrous reinforcement material in composites according to this invention. However, the use of other fibrous materials providing reinforcement supplementary to that of the glass fibres is not excluded, especially fibres of an artificial nature such as, for example, carbon fibres; usually the supplementary fibres will be present in lesser amount than the glass fibres although the use of comparable quantities, and sometimes equivalent amounts weight for weight, may be recommended for certain kinds of composite products. Chopped or other fibrous forms of glass may be used e.g. glass wool.

Examples of suitable glass fibres and products made therefrom will now be described.

EXAMPLE 1

Glasses of composition as set out in the accompanying Table 1 were pulled into single filaments with diameters in range 0.4 – 1.0 × 10⁻³ inches, and initial "abraded" strengths in the region of from 150,000 – 400,000 lbs/sq. in. They were then tested for alkali-resistance according to the method previously described, with the results given in the Table.

The Table also provides by way of comparison corresponding results obtained for a filament of a standard low alkali borosilicate glass known in the trade under the name E-glass, and containing 8% B₂O₃.

The results of this Table indicate that the glass fibres are particularly suitable for reinforcing Portland cement structures, and are substantially superior in this respect to fibres of E-glass.

EXAMPLE 2

Glass similar to those in Table 1 but containing a much higher proportion of MnO is also suitable as reinforcing fibres. The performance of a glass fibre made from typical compositions of this family is shown in Table 2.

(90% R.H.) room. Different curing conditions were used and the flexural strength of the test specimens were determined at different ages. Results are given in Table 3 for a typical alkali-resistant glass, the glass No. 1 in Table 1, in comparison with the previously mentioned E-glass. The values given are for flexural strengths in terms of lbs/sq. in.

TABLE 1

| Glass No. | Analysis of the raw mix | | | | | | | Alkali-resistance | | |
| --- | --- | --- | --- | --- | --- | --- | --- | --- | --- | --- |
| | CaO | SiO$_2$ | Al$_2$O$_3$ | MgO | TiO$_2$ | MnO | CaF$_2$ | % reduction in diameter | Tensile strength after test (lbs/sq. in.) | Tensile strength before test (lbs/sq. in) |
| 1 | 19 | 55 | 21 | 5 | — | — | — | Nil | 130,000 | 155,000 |
| 2 | 15 | 56 | 21 | 5 | — | — | 3 | 4 | 120,000 | 200,000 |
| 3 | 18 | 55 | 17 | 5 | — | 5 | — | 7.5 | 180,000 | 255,000 |
| 4 | 10 | 60 | 15 | 5 | 5 | 5 | — | Nil | 190,000 | 170,000 |
| 5 | 15 | 55 | 15 | 3 | 6 | 6 | — | Nil | 250,000 | 430,000 |
| E | | | | | | | | 9 | 70,000 | 250,000 |

TABLE 2

| Glass No. | Analysis of the glass | | | | | Alkali-resistance | | |
| --- | --- | --- | --- | --- | --- | --- | --- | --- |
| | CaO | SiO$_2$ | Al$_2$O$_3$ | MgO | MnO | % reduction in diameter | Tensile strength after test (lbs/sq. in.) | Tensile strength before test (lbs/sq. in.) |
| 6 | 17.0 | 54.5 | 11.5 | 7.2 | 9.8 | 3 | 175,000 | 315,000 |

In a preferred way of making fibre-reinforced cement-based composites, a high water/solid ratio is used initially for uniform dispersion of fibres and the excess water is removed by suction followed by pressing. Complicated shapes can be made by spray mixing of cement slurry and glass fibre on the surface of perforated moulds connected to a vacuum pump.

Composites measuring 4 × 1 × ¼ inches have been made by this method using single-filament uncoated fibres derived from some of the glasses referred to in the above Examples and Portland cement. The proportion of glass fibre in the composites was 0.5 gm. of glass to approximately 30 gms. of cement. The initial water/cement ratio in the slurry was 0.8, which fell to 0.3 after suction. Glass fibres measuring 4 inches in length were placed by hand in the tension zone of these composites during casting. A perforated mould was used and the excess water removed by suction. After demoulding, the composite test specimens were stored in a constant temperature (64°F), constant humidity In further comparison, asbestos-cement boards of ¼ inch thickness and containing 10 – 15% asbestos gave an ultimate flexural strength of 4000 lbs/sq. in.

It should be noted that no attempt was made to optimise the fibre content of composites in Table 3 to yield the highest possible flexural strength; also, the strengths given in Table 3 are average values only and do not reflect the wide scatter observed in the tests.

TABLE 3

| Glass No. | After 7 days in water | After 28 days in water | After 90 days in water | After 7 days in water and 21 days in air | After 7 days in water and 83 days in air |
| --- | --- | --- | --- | --- | --- |
| 1 | 6,000 | 4,900 | 5,000 | 6,550 | 4,600 |
| | 5,890 | 5,260 | 5,030 | 5,200 | 4,810 |
| E-Glass | 4,470 | 4,350 | 3,930 | 4,950 | 3,300 |

In composites made with single filament glass fibre it is difficult to avoid uneven dispersion of the fibres in the mix; hence the wide variation in results.

EXAMPLE 3

A glass of composition as set out in the accompanying Table 4 Glass No. 1 was pulled into single filaments with a diameter in the range $0.4 - 1.0 \times 10^{-3}$ inches. A filament was tested for alkali-resistance according to the method previously described when using Ca(OH)$_2$ as alkali, in comparison with a similar filament of a standard low alkali borosilicate glass known under the name E-glass, with the results given in the table.

TABLE 4

| Glass No. | Analysis of the Raw Mix | | | | | Alkali resistance | | |
|---|---|---|---|---|---|---|---|---|
| | SiO$_2$ | Al$_2$O$_3$ | ZrO$_2$ | Na$_2$O | Li$_2$O | % reduction in diameter | tensile strength after test | tensile strength before test |
| 1 | 71.0 | 1.0 | 16.0 | 11.0 | 1.0 | Nil | 190,000 | 210,000 |
| E | | | | | | 9 | 70,000 | 255,000 |

Results are given in Table 5 for the resistance exhibited at 80°C by filaments of Glass 1 and E-Glass using as alkali in the test previously described with an alkali metal hydroxide, a "cement effluent" solution of the composition specified hereinbefore.

TABLE 5

| Glass No. | Diameter of fibre before test (ins) | Tensile strength (lb/in$^2$) | | | |
|---|---|---|---|---|---|
| | | Before test | After 24 hr | After 48 hr | After 72 hr |
| 1 | 0.45 × 10$^{-3}$ | 415,000 | 340,000 | 265,000 | 180,000 |
| E | 0.48 × 10$^{-3}$ | 425,000 | 110,000 | 40,000 | 40,000 |

The strength values of the two glass fibres before test as listed in this table are higher than those in Table 4. This is due to the fact that the fibres were tested in this case soon after they were pulled and did not have the chance to reach their abraded strength, which is always substantially lower than the virgin strength as previously described.

The diameter of the fibre glass No. 1 remained unchanged after the tests. E-glass fibres were so badly attacked in the test that their diameters could not be measured very accurately afterwards. However, in each case they were found to be definitely smaller than those of the fibres before the test.

In calculating tensile strength of E-glass fibres at all ages after the test, it has been assumed that the diameter remained the same as before the test.

Table 6 provides comparable alkali-resistance test results in the instance when the alkali employed is N NaOH as described above.

TABLE 6

| Glass No. | Alkali resistance | | |
|---|---|---|---|
| | % reduction in diameter | tensile strength after test | tensile strength before test |
| 1 | 5 | 185,000 | 210,000 |
| E | 59 | 260,000 | 255,000 |

It will be noted that the apparent increase in strength due to NaOH attack in the case of E-glass is due to the very large reduction of the diameter of the fibres. If the attack progresses as vigorously as is indicated by this test, there would shortly be no glass-fibre left at all to reinforce the cementitious matrix.

The result of Tables 4, 5 and 6 indicate that fibres of the glass are particularly advantageous for reinforcing Portland cement structures. Further tests have shown that at this temperature (80°C) fibres products from Glass No. 1 when kept immersed in the cement effluent solution for a period of 2 weeks still retain some measurable tensile strength. After 96 hours exposure, the E-glass fibres could not be tested.

Results are given in Tables 7 and 8 for the flexural strengths of Portland cement composites reinforced by fibres of Glass No. 1 (two sets of results) in comparison with strengths for composites reinforced by fibres of E-glass. The values given are for flexural strengths in terms of lbs/sq. in. Manufacture of the composites and the test conditions were carried out as described in my earlier Patent Application No. 649,463.

TABLE 7

| Glass No. | After 7 days in water | After 28 days in water | After 90 days in water | After 7 days in water and 21 days in air | After 7 days in water and 83 days in air |
|---|---|---|---|---|---|
| 1 | 5120 | 4980 | 4950 | 5940 | 4600 |
| | 4970 | 4780 | 5260 | 5870 | 5530 |
| E | 4470 | 4350 | 3930 | 4950 | 3300 |

In further comparison, asbestos-cement board of ¼ inch thickness and containing 10 – 15% asbestos gave an ultimate flexural strength of 4000 lbs/sq. in.

Flexural strengths of composites fabricated in a similar fashion but cured at 50°C under water are given in Table 8 for composites made with Glass No. 1 and E-glass fibres and ordinary Portland cement (two sets of results in each case).

TABLE 8

| Glass No: | 7 days in water | 28 days in water at 50°C | 90 days in water at 50°C |
|---|---|---|---|
| 1 | (4,470 | (3,860 | (2,630 |
| | (5,490 | (3,960 | (2,810 |
| E | (5,360 | (2,270 | (2,220 |
| | (4,200 | (1,860 | (2,380 |

Long term results on flexural strengths, again in terms of lbs/sq. in. of composites made with Glass No. 1 fibres are set out in Table 9.

TABLE 9

| In water | | In air after first 7 days in water | |
|---|---|---|---|
| 180 days | 365 days | 180 days | 365 days |
| 5370 psi | 4360 psi | 5400 psi | 4680 psi |
| (average of 6) | (average of 3) | (average of 6) | (average of 3) |

These values refer to the second series of values given for Glass No. 1 in Table 7. The values given in Table 7 are averages of nine results and cannot be compared, in the strictest sense, with the present results. Although a drop in strength is noted after one year, these results are vastly superior to those obtainable with E-glass fibres.

It should be noted that no attempt was made to optimise the fibre content of composites in Tables 7, 8 to yield the highest possible flexural strength; also, the strengths given in Table 7 are average values only and do not reflect the wide scatter observed in the tests. In composites made with single filament glass fibre it is difficult to avoid uneven dispersion of the fibres in the mix; hence the wide variation in results.

EXAMPLE 4

Glasses of composition given in Table 10 were used. The amount of fluxing agent is expressed as a percentage of the total $SiO_2$, $Na_2O$, $SnO_2$ combined weight. The glasses were pulled into single filaments with a diameter in the range $0.4 - 0.5 \times 10^{-3}$ inches, and a filament of each glass was tested for alkali-resistance according to the method previously described using Ca$(OH)_2$ as alkali. The results are given in Table 11.

Results are given in Table 12 for the resistance exhibited at 80°C by filaments in the test previously described using, instead of an alkali metal hydroxide, the typical cement effluent solution of composition given hereinbefore.

Table 13 provides comparable alkali-resistance test results for filaments when the alkali employed is N NaOH as described above. The filaments again had diameters in the range of $0.4 - 0.5 \times 10^{-3}$ inches.

In these TABLES, the quotes tensile strength values were obtained using apparatus described in Current Paper No. 26/68 (March 1968) issued by the Building Research Station, Bucknalls Lane, Garston, Watford, Hertfordshire, under the title "Apparatus for testing tensile strengths of corroded glass fibres" (R. S. Gillett and A. J. Majumdar). Composites measuring $4 \times 1 \times \frac{1}{4}$ inches have been made using single-filament uncoated fibres derived from the tin oxide glasses of Table 10 by the same method as described in Example 2.

Results are given in Table 14 for the flexural strengths of Portland cement composites reinforced by fibres of Glass No. 1. The values given are for flexural strengths in terms of lbs/sq. in. Manufacture of the composites and the test conditions were carried out as described in my application Ser. Nos. 649,463 and 748,645.

TABLE 10 - Glass Fibre Compositions

| Glass No. | Analysis of glass (wt%) | | | Flux (wt% glass) | | Tensile Pristine strength (lbs/in.²) |
|---|---|---|---|---|---|---|
| | $SiO_2$ | $Na_2O$ | $SnO_2$ | $Li_2O$ | $La_2O_3$ | |
| 1 | 70.0 | 14.0 | 16.0 | 1.0 | — | 320,000 |
| 2 | 80.0 | 10.0 | 10.0 | 1.0 | — | 270,000 |
| 3 | 77.0 | 13.0 | 10.0 | 1.0 | — | 290,000 |
| 4 | 74.0 | 12.0 | 14.0 | 1.0 | — | 310,000 |
| 5 | 70.0 | 14.0 | 16.0 | — | 2.0 | 320,000 |

TABLE 11 - Ca(OH)₂ Test

| Glass No. | Tensile strength after test (lbs/in.²) | Reduction in diameter (%) |
|---|---|---|
| 1 | 250,000 | 1.0 |
| 2 | 240,000 | <1.0 |
| 3 | 200,000 | <1.0 |
| 4 | 230,000 | <1.0 |
| 5 | 220,000 | <1.0 |

TABLE 12 - Cement Effluent Test

| Glass No. | Tensile strength after | | | | Reduction in diameter after 2 weeks (%) |
|---|---|---|---|---|---|
| | 1 wk. | 2 wks. | 4 wks. | 24 wks. | |
| 1 | 110,000 | 80,000 | 50,000 | 70,000 | — |
| 2 | 130,000 | 100,000 | 110,000 | 70,000 | 1.0 |
| 3 | — | 120,000 | 120,000 | — | <1.0 |
| 4 | — | 105,000 | — | — | <1.0 |
| 5 | 150,000 | 140,000 | 100,000 | — | 1.0 to 2.0 |

TABLE 13 - NaOH Test

| Glass No. | Tensile strength after test | Reduction in diameter (%) |
|---|---|---|
| 1 | 220,000 | 3 - 6 |
| 2 | — | — |
| 3 | 200,000 | 4 - 5 |
| 4 | 200,000 | 2 - 3 |
| 5 | 210,000 | 3 - 4 |

TABLE 14

PORTLAND CEMENT COMPOSITE STRENGTHS
(modulus of rupture in lbs/in.²)

| Glass No. | After 7 days in water | After 28 days in | | After 90 days in | | After 6 months in | | After 1 year in | |
|---|---|---|---|---|---|---|---|---|---|
| | | water | air | water | air | water | air | water | air |
| 1 | 5720 | 7100 | 6750 | 6440 | 6150 | 6110 | 6750 | 5050 | 6000 |

EXAMPLE 5

Tests were carried out on cement/fibre composites comparing the silica zirconia fibres having the composition of Glass No. 1 recited in Table 4 above with fibres of E-glass. In this Example the cement used was Cement Fondu, a calcium aluminate cement manufactured by Lafarge U.K. Ltd. The silica-zirconia fibre was supplied in the form of continuous roving consisting of 36 – 40 strands. Each strand consisted of 204 filaments having diameters in the range 13 – 15 μm. The E-glass fibre used in this study was supplied as continuous rovings, each roving comprising strands each having 136 filaments 11 – 13 μm in diameter. Both types of glass fibres had a polyvinyl acetate coating on them.

In this method, cement slurry having a high water/dry cement ratio (40 – 50%) and glass-fibre rovings chopped in-situ to the desired lengths were sprayed simultaneously on to a papercovered, perforated metal face of a suction mould. Spraying was continued until a thickness of 10 to 13 mm was attained. The top surface was then levelled off and the excess water extracted by the application of suction. The quantity of Glass No. 1 fibres used was 5% by weight of the wet board at this stage whereas with E-glass 6% by weight was used. Immediately after this the composite boards were removed from the mould, cut into 150 mm × 1 m strips with a knife, covered with polythene sheets and stored under laboratory conditions for 7 days. When the boards had hardened sufficiently, they were sawn into small 150 × 50 mm specimens and after 7 days storage in the moist environment, the specimens were randomly selected and were placed under different curing conditions. In the case of the board made with the alkali resistant fibre, a portion of the board measuring 1 × 1 m was left uncut and this was removed to a 90 per cent humidity room for storage subsequent to the initial 7-day moist curing.

In general, three conditions of storage were used: (a) under water at 18°C, (b) in air of 40% RH at 18°C and (c) natural weatherings. Specimens subjected to natural weatherings were kept in a horizontal position well above the ground on a wooden frame placed on the exposure site.

For each type of GRC composite material stored under the environmental conditions mentioned above, tests were carried out to determine the flexural strength, the tensile strength and the resistance to impact. The flexural and tensile strengths were determined using an Instron testing machine whereas for measuring the impact strength of the material an Izod-type instrument having a capacity of 12 Joules was employed. The results are shown in Table 15.

$0.4$ to $1.0 \times 10^{-3}$ inches said fibre has a tensile strength of at least 100,000 p.s.i. after treatment with saturated aqueous $Ca(OH)_2$ solution at 100°C for 4 hours followed by successive washings at ambient temperature with water, then with aqueous hydrochloric acid (1%) for 1 minute, water, acetone, followed by drying, said fibre experiencing not more than 10% reduction in diameter during said test.

2. A cementitious product according to claim 1, in which the cement is Portland cement.

3. A cementitious product according to claim 1, in which the glass reinforcement is provided by fibres of diameter $0.4$ to $1.0 \times 10^{-3}$ inches.

4. A cementitious product according to claim 3, in which the fibres have a length of up to 4 inches.

5. A cementitious product according to claim 1, in which the fibres are single filaments.

6. A cementitious product according to claim 1, being a pipe or roofing sheet.

7. A cementitious product according to claim 1, wherein the glass contains about 17.0% CaO, 11.5% $Al_2O_3$, 7.2% MgO, 54.5% $SiO_2$ and 9.8% MnO, by weight.

8. A cementitious product according to claim 1, containing about 15% CaO, 15% $Al_2O_3$, 55% $SiO_2$, 3% MgO, 6% $TiO_2$, 6% MnO, by weight.

9. A cementitious product according to claim 1, wherein the glass contains up to 10% by weight of a fluxing agent.

10. A cementitious product according to claim 9, wherein the fluxing agent is $CaF_2$.

11. A cementitious product according to claim 10, wherein the glass contains about 15% CaO, 21% $Al_2O_3$, 56% $SiO_2$, 3% $CaF_2$, 5% MgO, by weight.

12. A cementitious product according to claim 1, in which the glass is one capable of being drawn into continuous fibres.

13. A cementitious product according to claim 1, in which the glass is substantially boron-free glass and contains in percent by weight.

| a | CaO | 10 – 21 |
| | $Al_2O_3$ | 12 – 21 |
| | $SiO_2$ | 50 – 60 |
| | MgO | 3 – 10, or |

TABLE 15

| | COMPOSITE | TENSILE STRENGTH (P.S.I.) | | FLEXURAL STRENGTH (P.S.I.) | | IMPACT STRENGTH (inch-lb/sq.in.) | |
|---|---|---|---|---|---|---|---|
| | | 28 days | 1 year | 28 days | 1 year | 28 days | 1 year |
| Storage Conditions (a) | E-glass | 2650 | 1100 | 6630 | 2730 | 165 | 18 |
| | Glass No. 1 | 2530 | 2140 | 6000 | 5300 | 145 | 130 |
| Storage Conditions (b) | E-glass | — | — | 6630* | 5700 | 165* | 110 |
| | Glass No. 1 | 2430 | 2260 | 6650 | 5900 | 130 | 132 |

*water-cured

I claim:

1. A composite fibre/cementitious product comprising fibrous material distributed throughout a cement matrix as a reinforcing material and subject where the surface is exposed to the cement matrix, to the corrosive action of said matrix, in which the reinforcing material is primarily a glass having per se a degree of alkali-resistance such that when tested in the form of an abraded fibre of length 2½ inches and diameter of from b. $ZrO_2$ in partial substitution for $SiO_2$ in (a), or c. at least one of $TiO_2$, $Fe_2O_3$ and $Cr_2O_3$ in partial substitution for $Al_2O_3$ in (a), or d. at least one of BaO, MnO and ZnO in partial substitution for CaO in (a), and wherein when one or more of (b), (c) and (d) obtain e. the total amount of said substituted oxides of (b), (c) and (d) is up to 10% by weight of said glass.

14. A cementitious product according to claim 13, wherein the glass contains about 19.0% CaO, 21% Al$_2$O$_3$, 55% SiO$_2$, 5% MgO by weight.

15. A cementitious product according to claim 13, wherein the glass contains about 18.0% CaO, 17% Al$_2$O$_3$, 55% SiO$_2$, 5% MgO, 5% MnO, by weight.

16. A cementitious product according to claim 13, wherein the glass contains about 10% CaO, 15% Al$_2$O$_3$, 60% SiO$_2$, 5% MgO, 5% TiO$_2$, 5% MnO, by weight.

* * * * *